Patented June 25, 1946

2,402,614

UNITED STATES PATENT OFFICE 2,402,614

CATALYTIC PROCESS

Mark W. Farlow and Frank K. Signaigo, Wilmington, Del., assignors to E. I. du Pont de Nemours & Company, Wilmington, Del., a corporation of Delaware No Drawing. Application September 19, 1940
Serial No. 357,418

21 Claims. (Cl. 260—609)

This invention relates to a process for production of aliphatic thiols.

Aliphatic sulfides, in general, are readily obtained by synthetic methods and several naturally occurring materials contain aliphatic sulfide linkages. These sulfides are, however, for the most part little reactive and this has prevented their extensive use as chemical intermediates. Chemical reduction methods for converting disulfides to thiols are known, but these are expensive, involving complicated operations and high reagent consumption. Monosulfides are not convertible to thiols by the usual chemical reduction methods. The conversion of organic sulfides to thiols by heating with hydrogen sulfide has been described, but the yields reported are in most cases indifferent. If an economical process were available for converting aliphatic sulfides to the more reactive thiols, a new class of chemical raw materials would thus be made useful. This invention has as its object a process for converting aliphatic sulfides to aliphatic thiols. Another object is to reduce aliphatic sulfides to thiols by an economical catalytic method. Other objects will be apparent from the following description of the invention.

These objects are accomplished by the following invention which comprises reacting an aliphatic sulfide with hydrogen in the presence of a base metal sulfide hydrogenation catalyst at a temperature not exceeding 300° C.

In practicing this invention, the aliphatic sulfide is charged into a hydrogenation autoclave together with a sulfactive hydrogenation catalyst and hydrogen at superatmospheric pressure. The autoclave is then agitated and heated to a temperature at which reaction proceeds at a suitable rate. If a di- or multisulfide is to be processed, temperatures in the range from 125 to 150° C. are satisfactory. If a monosulfide is to be hydrogenated to a thiol, then higher temperatures are usually required. After the reaction is complete as evidenced by no further absorption of hydrogen, the autoclave is cooled and the reaction mixture is filtered from the catalyst. The crude thiol may then be isolated or purified usually by distillation. The following examples show in greater detail the practice of this invention in several of its modifications. The amounts of materials referred to are parts by weight.

Example I

A sulfactive hydrogenation catalyst is prepared as follows: A solution of 240 parts of sodium sulfide nonahydrate and 640 parts of sulfur in 1500 parts of water is added with stirring to a solution of 238 parts of cobalt chloride hexahydrate in 1700 parts of water. The black precipitate is filtered with suction and washed substantially free from soluble salts with water. Since the catalyst oxidizes spontaneously when exposed to air with resulting loss in catalytic activity, it is stored and used as an aqueous paste or, alternatively, the precipitate after washing with water is washed with an organic solvent to remove most of the water and stored and used as a non-aqueous paste. Examples of solvents that may be used for pasting the catalyst are alcohols, ethers, hydrocarbons, and organic acids. This catalyst in the form of a dioxane paste is used to hydrogenate an aliphatic disulfide to the corresponding thiol as follows:

Thirty-three parts of di-2-ethylhexyl disulfide is charged into a hydrogenation autoclave together with 3 parts of cobalt polysulfide catalyst (dry basis) and 80 parts of dioxane solvent. The autoclave is then filled with hydrogen to an initial pressure of 900 lbs./sq. in. and agitated and heated to 155° C. The reaction becomes moderately rapid when the temperature reaches 100° C. as evidenced by the decrease in pressure. After the autoclave has been heated at 155° for ¾ hour, no further hydrogen is absorbed and the autoclave is cooled and the reaction mixture is filtered to separate the catalyst. By distillation at reduced pressure, the solvent is separated from the thiol and there is obtained, in nearly quantitative yield, pure 2-ethylhexanethiol-1. The thiol boils at 90° C. at 35 mm., has a density of $d_4^{25}=0.8467$, refractive index $n_D^{25}=1.4524$. The hydrogen reduction of the disulfide to the thiol may be formulated by the following equation:

$$RSSR + H_2 \xrightarrow{\text{catalyst}} 2RSH$$

Example II

A nickel sulfide hydrogenation catalyst is prepared as described in Example I for the cobalt sulfide catalyst except that an equivalent amount of nickel chloride hexahydrate is substituted for the cobalt chloride hexahydrate. Fifty parts of di-n-butyl disulfide is charged into a hydrogenation autoclave together with 5 parts of nickel polysulfide catalyst (dry basis) and 125 parts of dioxane solvent. The autoclave is then charged with hydrogen to an initial pressure of 500 lbs./sq. in. and agitated and heated to 150° C. Rapid hydrogen absorption is evidenced by the drop in pressure and additional hydrogen is added from time to time to replace that absorbed, the total pressure being maintained within the range from 500 to 1000 lbs./sq. in. After one hour at 150° C. no further hydrogen absorption is noted as the autoclave is heated for an additional hour to insure completion of the reaction. The contents of the cooled autoclave are filtered from the catalyst and blown with nitrogen to remove any hydrogen sulfide that might be formed. Titration of an aliquot of the reaction mixture with standard iodine solution indicates the yield of butanethiol-1 to be 73% of the theoretical.

*Example III*

The above experiment is repeated under identical conditions except that 5 parts of finely divided pyrophoric iron and 5 parts of sulfur are substituted for the nickel sulfide catalyst used in the preceding example. The finely divided pyrophoric iron is prepared by extracting the aluminum with boiling caustic solution from a finely ground alloy of equal weights of iron and aluminum. During the period of heating the autoclave to reaction temperature, the pyrophoric iron reacts with the sulfur, forming an active iron sulfide hydrogenation catalyst. After completion of the reaction, the product is worked up as described in the preceding example and butanethiol-1 is obtained in 78% yield. By diluting the filtered reaction mixture with 5 volumes of water, the butanethiol separates as a colorless oil which boils at 94–96° C. at atmospheric pressure.

*Example IV*

Seventy-five parts of technical dibenzyl disulfide and 100 parts of benzene are charged into an autoclave together with 5 parts of cobalt sulfide catalyst prepared as described in Example I. The autoclave is charged with hydrogen to an initial pressure of 2000 lbs./sq. in. and the autoclave is agitated and heated to 125° C. The pressure has decreased considerably by the time the temperature reaches 125° C. and there is little additional pressure decrease during one hour heating at this temperature. The autoclave is cooled and the crude reaction mixture is filtered from the catalyst and fractionally distilled. After the benzene solvent distills there is obtained a fraction consisting of 8 parts of toluene. Following this, 55 parts of pure phenylmethanethiol distills over at 99° C. at 33 mm. pressure. There is also obtained 16 parts of high-boiling distillation residue. The toluene is formed by hydrogenolysis of the phenylmethanethiol. Usually this side reaction is noted only in the production of aliphatic thiols which have an aryl group attached to the carbon atom bearing the thiol group. The formation of these products may be formulated as follows:

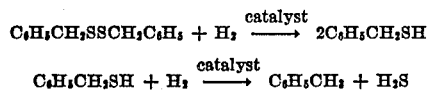

*Example V*

Fifty parts of dicyclohexyl disulfide and 5 parts of cobalt sulfide catalyst are charged into a hydrogenation autoclave together with hydrogen at an initial pressure of 900 lbs./sq. in. The autoclave is then stirred and heated. After 20 minutes the temperature has reached 90° C. and the pressure begins to decrease and continues to drop until the temperature reaches 150° C. at the end of 45 minutes. No further decrease in pressure occurs during an additional half hour of heating at 150° C., and the autoclave is cooled and the crude product is rinsed out with dioxan. The dioxan solution is then filtered from the catalyst and vacuum distilled. The foreshot of solvent is followed by 47 parts of pure cyclohexanethiol which distills over at a temperature of 90° C. at 100 mm. pressure. The yield is 93%.

The above experiment is repeated under similar conditions except that 5 parts of molybdenum sulfide catalyst are substituted for the cobalt sulfide catalyst used in the preceding example. The molybdenum sulfide catalyst is prepared by heating ammonium thiomolybdate at 110° C. The autoclave is stirred and heated under an initial hydrogen pressure of 900 lbs./sq. in. After one hour the temperature has reached 170° C. and the pressure begins to decrease. After two hours, additional heating at 170–185° C. no further pressure drop occurs and the autoclave is cooled and the crude product is worked up as described above. In this manner there is obtained 49.5 parts of pure cyclohexanethiol. The yield is 98%.

*Example VI*

An aliphatic multisulfide is catalytically hydrogenated to a mixture of thiols as follows:

Twenty-eight parts of crude sulfurized pentadecene-7 prepared by reacting pentadecene-7 with three atomic equivalents of sulfur, is charged into a hydrogenation autoclave together with 60 parts of xylene solvent and 3 parts of cobalt polysulfide catalyst. Hydrogen is added to the autoclave to an initial pressure of 1000 lbs./sq. in., and the autoclave is agitated and heated at 150–160° C. for four hours. The autoclave is then cooled and the crude reaction mixture is filtered from the catalyst and fractionally distilled. The following fractions are obtained after removal of the solvent:

| Fraction No. | B. P./16 mm. | Amount | Product |
| --- | --- | --- | --- |
| | | *Parts* | |
| 1 | 156–173° C | 3.2 | Hydrocarbon foreshot. |
| 2 | 173–174° C | 8.6 | Pentadecanethiol. |
| 3 | 196–197° C | 4.6 | Pentadecanedithiol. |
| 4 | Distillation residue | 3.0 | |

*Example VII*

A polymeric multisulfide is catalytically hydrogenated to a monomeric thiol as described in the following experiment. Eighty-five parts of the polymeric product obtained by reacting symmetrical-tetrabromoneopentane with sodium tetrasulfide is charged into a hydrogenation autoclave together with 135 parts of dioxane and 10 parts of cobalt sulfide catalyst. The autoclave is filled with hydrogen to an initial pressure of 2500 lbs./sq. in and heated at 150° C. for 5 hours. Additional hydrogen is added occasionally to replace that absorbed. The autoclave is then cooled and the reaction mixture is filtered from the catalyst and blown with nitrogen to remove the hydrogen sulfide formed. Titration of an aliquot of the reaction mixture with standard iodine solution indicates the presence of 0.75 equivalent of thiol for each 85 grams of polymer charged. Removal of the solvent by distillation yields a residue which solidifies on cooling to a white solid. By recrystallizing this solid from ethanol there is obtained pure symmetrical-neopentanetetrathiol melting at 72–73° C.

*Example VIII*

The process of this invention is applicable also to the conversion of monosulfides to thiols. This is shown by the following experiment: Sixty-five parts of di-n-butyl sulfide is charged into a hydrogenation autoclave together with 100 parts of dioxane solvent and 7 parts of cobalt sulfide catalyst prepared as described in Example I. The autoclave is charged with hydrogen to an initial pressure of 1500 lbs./sq. in. and heated at 250° C. for 6 hours. The autoclave is then cooled, and the reaction mixture is filtered from the catalyst. The filtrate is then diluted with water and the oil layer which forms is separated from the water layer. It is washed with water, dried over sodium sulfate, and distilled. The first fraction consists of 5.4 parts of butanethiol-1. This is followed by 52 parts of unconverted dibutyl sulfide. The conversion to butanethiol is 13.5%. The yield, based on the amount of starting material not recovered, is 67.5%. This transformation may be formulated as follows:

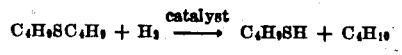

Example IX

The conversion of a different type of aliphatic sulfide to thiols by the process of this invention is illustrated by the hydrogenation of the diethyl dithioketal of methyl ethyl ketone. One hundred three parts of this material in crude form is charged into a hydrogenation autoclave together with 15 parts of cobalt polysulfide catalyst. The autoclave is charged with hydrogen to an initial pressure of 2000 lbs./sq. in. and agitated and heated at a temperature of 150–175° C. for 4.5 hours. Additional hydrogen is added occasionally to replace that absorbed. After this period the autoclave is cooled and the reaction mixture is rinsed out with ether, filtered from the catalyst, and fractionally distilled. The following fractions are obtained:

| Fraction No. | B. P. | Amount | S | Analyses | | |
|---|---|---|---|---|---|---|
| | | | | S (as SH) | C | H |
| | | Parts | | Percent | | |
| 1 | 35–40° C | 82 | | 18.9 | | |
| 2 | 80–94° C | 26 | 26.0 | 23.7 | | |
| 3 | 131–132° C | 10 | 26.4 | 1.2 | 60.1 | 11.6 |
| 4 | Distillation residue | 1 | | | | |

Fraction 1 is a mixture of the ether solvent and 30 parts of ethanethiol. Fraction 2 is impure butanethiol-2. The principal contaminant is probably methyl ethyl ketone present also in the starting material. Fraction 3 is moderately pure ethyl sec.-butyl sulfide as indicated by the analyses (calc. for $C_6H_{14}S$: S=27.1%, C=61.0%, H=11.9%). The formation of these products may be formulated as follows:

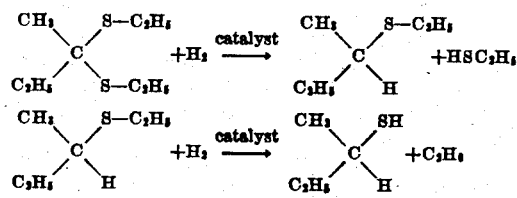

and

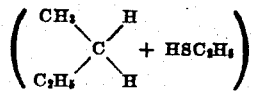

The products may be formed also by other reactions similar to those illustrated above.

Example X

The process of this invention is applicable also to the conversion of sulfides containing other functional groups. This is shown by the following experiment: Seventy-five parts of disorbityl disulfide ($CH_2OH(CHOH)_4CH_2S-$)$_2$ is charged into a hydrogenation autoclave together with 100 parts of water and 8 parts of a cobalt sulfide catalyst. Hydrogen is added to the autoclave at an initial pressure of 1000 lbs./sq. in., and the autoclave is agitated and heated at a temperature of 125° C. for three hours. Hydrogen is added occasionally to replace that absorbed, the pressure being maintained within the range from 1000 to 1500 lbs./sq. in. After this period, the autoclave is cooled and the reaction mixture is filtered from the catalyst. The aqueous solution of crude product is heated at 100° C. under reduced pressure to remove the water. The residue consists of 69 parts of 1-thiosorbitol $$(CH_2OH(CHOH)_4CH_2SH)$$

of 96% purity in the form of a viscous syrup. On standing, this crystallizes to a white solid which after recrystallization from anhydrous ethanol melts at 89–92° C.

The conversion of various sulfides to the corresponding thiols has been illustrated in the foregoing examples. This invention is, however, not limited to these particular materials and is likewise applicable generally to other aliphatic sulfides. Such compounds may be represented by the following general formulas:

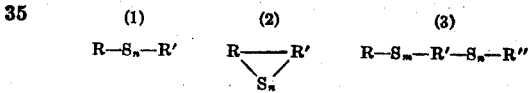

in which $m$ and $n$ stand for small integers and R, R', and R'' stand for identical or different aliphatic or cycloaliphatic groups. These groups may be saturated or unsaturated and may contain also other functional groups or linkages such as the hydroxyl, amino, substituted amino, halogen, carbonyl, carboxyl, aryl, nitro, ether, amide, and ester groups. Examples of specific sulfides represented by these formulas and convertible to thiols by the process of this invention are:

(a) Saturated aliphatic sulfide (Formula 1) such as di-tert.butyl sulfide, di-n-amyl sulfide, methyl lauryl sulfide, di-isoamyl disulfide, di-octyl disulfide, dilauryl disulfide.

(b) Unsaturated aliphatic sulfide (Formula 1) such as diallyl sulfide, diallyl disulfide, diallyl trisulfide, allyl butyl sulfide, dioleyl disulfide.

(c) Cycloaliphatic sulfides (Formula 1) such as dicyclohexyl sulfide, dibornyl disulfide, cyclohexyl methyl sulfide, dicyclopentenyl disulfide, di-p-menthenyl sulfide.

(d) Cyclic sulfide (Formula 2) such as ethylene sulfide, ethylene disulfide, divinylene disulfide, trimethylene sulfide, trimethylene disulfide, dihydrothiophene, tetrahydrothiophene, tetrahydrothiopyrane, thioxane, 1,4-dithiane, sym.-trithiane.

(e) Sulfides having Formula 3 such as the thioacetals methylene-bis-octyl sulfide, ethylidene-bis-dodecyl sulfide; the thioketals such as 2-propylidene-bis-heptyl sulfide; and compounds such as ethylene-bis-ethyl sulfide, ethylene-bis-isoamyl sulfide.

(f) Sulfides containing other functional or substituent groups such as thiodiglycol, bis-(beta-oxyethyl-) disulfide, sorbityl dodecyl sulfide, sorbityl allyl sulfide, disorbityl disulfide, beta,beta'-diamino-diethyl disulfide, cystine, beta,beta'-dichlorodiethyl sulfide, bis-(acetylcarbothoxymethyl) sulfide, thiodiglycolic acid, dithiodiglycolic acid, methylene-bis-thioglycolic acid, dibenzyl sulfide, di-p-nitrobenzyl disulfide, di-o-methoxy-benzel sulfide, furfuryl disulfide.

Mixed alkyl aryl sulfides may likewise be converted to aliphatic thiols by the process of this invention. For example, a monosulfide of this type may be converted to a thiol according to the following equation:

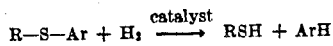

$$R-S-Ar + H_2 \xrightarrow{catalyst} RSH + ArH$$

Examples of compounds of this class are dodecyl phenyl sulfide, octyl naphthyl sulfide and the like. In addition to simple monomeric sulfides, the process of this invention is applicable also to the conversion to thiols of compounds or mixtures of undefined chemical formula. Examples of sulfides of this class are the reaction products of sulfur or sulfur halides with saturated or unsaturated aliphatic compounds such as sulfurized olefins, petroleum and vegetable oils, oleic acid, butadiene, cyclopentadiene, terpenes, dihydronaphthalene, and the like. Polymeric substances containing sulfide groups may likewise be catalytically hydrogenated to thiols by the process of this invention. Examples of such materials are the reaction products of aliphatic polyhalogen compounds with soluble metal sulfides or multisulfides, sulfur containing synthetic and natural rubbers, and sulfur containing protein substances such as wool, keratin, and serum albumin.

Although not essential, in many cases solvents may be employed in carrying out the hydrogenation process. Examples of solvents that may be used are water and organic solvents such as hydrocarbons, alcohols, and ethers and the like. In addition to inert solvents, alkalies, ammonia, amines, and acids may be present if desired.

The process of this invention may be operated over a considerable range of temperatures. Sulfides that contain two or more sulfur atoms in contiguous relation between two carbon atoms (e. g., $R-S-(S)_x-R'$) can be hydrogenated to thiols in many cases at temperatures as low as 100° C. As the temperature is raised, the rate of reaction usually increases, and it is therefore preferable to operate in most cases at temperatures above 100° C. Sulfides of the type represented by the formula $R-S-R'$ or $$\begin{array}{c} R-S-R' \\ \parallel \\ S \end{array}$$

(except where R or R' are radicals of the benzyl type) require usually temperatures of 200° C. or above for hydrogenation to thiols. Sulfides of the type represented by the formula

$$R-S-C-S-R''' \atop R' \; R''$$

are hydrogenated to thiols at temperatures of about 150 to 175° C. The upper temperature limit at which the process may be operated is determined chiefly by the thermal stability of the compounds involved and by the secondary reaction that occurs at high temperatures, namely, the hydrogenolysis of aliphatic thiols to hydrocarbons and hydrogen sulfide.

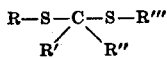

$$RSH + H_2 \xrightarrow{catalyst} RH + H_2S$$

Usually with simple aliphatic thiols this secondary reaction does not occur extensively at temperatures below 275° C. to 300° C. However, in the case of aliphatic thiols containing an aromatic nucleus attached to the carbon atom bearing the thiol group, the cleavage of thiol to hydrocarbon occurs at temperatures in the neighborhood of 150-200° C. Consequently, it is desirable to hydrogenate sulfides of the benzyl type at as low a temperature as possible so as to avoid the secondary reaction.

In most cases the reaction proceeds well even at low pressures of hydrogen, but in order to insure a practicable rate of reaction, it is desirable to operate at a hydrogen pressure of at least 100 lbs./sq. in. Purified hydrogen is not essential for the practice of this invention, and instead, hydrogen mixed with other gases, such as carbon dioxide, nitrogen, hydrogen sulfide, etc., may be used.

Examples of sulfactive catalysts that may be used in carrying out the process of this invention are the sulfides of the base metals such as chromium, cobalt, copper, iron, lead, molybdenum, nickel, tin, tungsten, and vanaduim. It is preferred, however, to use sulfides of the metals cobalt, molybdenum, nickel, and iron, since these have been found to be exceptionally active. Such catalysts may be prepared by a variety of methods as, for example, by precipitating the metal sulfide from a solution of a metal salt with hydrogen sulfide, a solution of alkaline earth metal sulfides or polysulfides or with ammonium sulfide or polysulfides. Another method that has been found to yield very active hydrogenation catalysts is to treat the finely divided pyrophoric or activated metal suspended in a liquid medium with hydrogen sulfide or sulfur until sulfidation is substantially complete. Other methods for obtaining metal sulfide catalysts include heating powdered metals or metal compounds such as the oxides, carbonates or sulfides with volatile sulfiding agents such as sulfur, hydrogen sulfide, or carbon bisulfide.

The hydrogenating activity of metal sulfides may be increased in many instances by treatment with hydrogen at elevated temperature. The hydrogen treatment of the metal sulfide often can be combined conveniently into a single operation with the hydrogenation reaction for which the catalyst is to be used. Instead of charging the metal sulfide as such, it may be formed in situ by placing the finely divided pyrophoric or activated metal in the autoclave together with sulfur or hydrogen sulfide. The metal will then be converted to the active metal sulfide during the early stages of the reaction process. The catalyst employed may be substantially a pure metal sulfide or a combination of metal sulfides. Other substances may be present also as, for example, kieselguhr, alumina, magnesia, carbon, and other supporting or promotor materials.

Usually an amount of sulfactive catalysts of from 1 to 15% by weight of the sulfide to be converted will produce a satisfactory rate of reaction, although other proportions may be employed as convenient.

The process of this invention may be operated batchwise or in a continuous manner. In the latter case, the catalyst is preferably formed into rigid lumps and the aliphatic sulfide, either in the liquid or vapor phase, is passed over the catalyst together with the hydrogen.

This invention constitutes a useful and economical process for converting aliphatic sulfides into the more reactive thiols, thus affording a new source of chemical intermediates for use as

We claim:

1. The process for the production of thiols which comprises reacting a member of the group consisting of acyclic sulfides and alicyclic sulfides with hydrogen in the presence of a base metal sulfide hydrogenation catalyst at a temperature not exceeding 300° C.

2. The process for the production of thiols which comprises reacting an unsubstituted sulfide selected from the group consisting of acyclic sulfides and alicyclic sulfides with hydrogen in the presence of a base metal sulfide hydrogenation catalyst at a temperature not exceeding 300° C.

3. The process for the production of thiols which comprises reacting a substituted sulfide selected from the group consisting of acyclic sulfide and alicyclic sulfide with hydrogen in the presence of a base metal sulfide hydrogenation catalyst at a temperature not exceeding 300° C.

4. The process in accordance with claim 3 characterized in that the substituted sulfide contains in addition to the sulfide group at least one group selected from the class consisting of hydroxyl, amino, halogen, nitro, carbonyl, aryl, amide, ester and ether groups.

5. The process in accordance with claim 1 characterized in that the sulfide is an open chain sulfide.

6. The process in accordance with claim 1 characterized in that the sulfide is a saturated open chain sulfide.

7. The process in accordance with claim 1 characterized in that the sulfide is a cyclic sulfide.

8. The process in accordance with claim 1 characterized in that the sulfide is a carbocyclic sulfide.

9. The process in accordance with claim 1 characterized in that the sulfide is an alicyclic sulfide.

10. The process for the manufacture of thiols which comprises reacting a monosulfide selected from the group consisting of acyclic sulfides and alicyclic sulfides with hydrogen in the presence of a finely divided activated base metal hydrogenation catalyst and a substance selected from the group consisting of sulfur and hydrogen sulfide at a temperature not exceeding 300° C.

11. The process for the manufacture of thiols which comprises reacting a multisulfide selected from the group consisting of acyclic sulfides and alicyclic sulfides with hydrogen in the presence of a finely divided activated base metal hydrogenation catalyst and a substance selected from the group consisting of sulfur and hydrogen sulfide at a temperature not exceeding 300° C.

12. The process in accordance with claim 11 characterized in that the multisulfide is a disulfide.

13. The process which comprises reacting a member of the group consisting of acyclic sulfides and alicyclic sulfides with hydrogen at a temperature not exceeding 300° C. in the presence of a sulfide of a metal of the iron group of the Periodic Table.

14. The process of claim 13 characterized in that the catalyst is cobalt sulfide.

15. The process for the production of thiols which comprises reacting a member of the group consisting of acyclic sulfides and alicyclic sulfides with hydrogen at a temperature not exceeding 300° C. in the presence of molybdenum sulfide.

16. The process for the production of thiols which comprises reacting a member of the group consisting of acyclic sulfides and alicyclic sulfides with hydrogen at a temperature not exceeding 300° C. in the presence of a metal polysulfide obtainable by precipitation of a soluble iron group metal salt with a substance selected from the class consisting of alkali sulfides and polysulfides, alkaline earth sulfides and polysulfides, and ammonium sulfide and polysulfide.

17. The process for the production of thiols which comprises reacting a member of the group consisting of acyclic sulfides and alicyclic sulfides with hydrogen at a temperature not exceeding 300° C. in the presence of a metal sulfide obtainable by treating a finely divided active metal with a sulfiding agent selected from the group consisting of sulfur, hydrogen sulfide and carbon bisulfide.

18. The process for the production of thiols which comprises reacting a member of the group consisting of acyclic sulfides and alicyclic sulfides with hydrogen in the presence of a sulfactive hydrogenation catalyst at a temperature not exceeding 300° C.

19. The process for the production of thiols which comprises reacting at a temperature not exceeding 300° C. a member of the group consisting of acyclic sulfides and alicyclic sulfides and hydrogen in the presence of a mixture of a finely divided pyrophoric metal and a compound selected from the class consisting of sulfur and hydrogen sulfide, thereby forming a sulfactive hydrogenation catalyst in situ.

20. The process for the production of thiols which comprises catalytically hydrogenating a member of the group consisting of acyclic sulfides and alicyclic sulfides at a temperature not exceeding 300° C. in the presence of a solvent for said sulfide.

21. The process in accordance with claim 20 characterized in that the solvent is an organic solvent.

MARK W. FARLOW.
FRANK K. SIGNAIGO.

Certificate of Correction

Patent No. 2,402,614.  June 25, 1946.

MARK W. FARLOW ET AL.

It is hereby certified that errors appear in the printed specification of the above numbered patent requiring correction as follows: Column 7, line 7, for "benzel" read *benzyl*; column 8, line 23, for "vanaduim" read *vanadium*; line 51, for "fineiy" read *finely*; column 9, line 26, claim 3, for "sulfide" read *sulfides*; line 33, claim 4, after "carbonyl" insert *carboxyl*; and that the said Letters Patent should be read with these corrections therein that the same may conform to the record of the case in the Patent Office.

Signed and sealed this 15th day of October, A. D. 1946.

[SEAL]

LESLIE FRAZER,
*First Assistant Commissioner of Patents.*